United States Patent [19]
Thony et al.

[11] Patent Number: 5,905,747
[45] Date of Patent: May 18, 1999

[54] ELECTROOPTICALLY SWITCHED SOLID MICROLASER WITH INDEPENDENT ELECTRODES AND PRODUCTION PROCESS

[75] Inventors: Philippe Thony, La Buisse; Engin Molva, Grenoble; Murièle Bergeon, Pierrelatte; Roger Accomo, Le Versoud, all of France

[73] Assignee: Commissariat a l'Energie Atomique, Paris, France

[21] Appl. No.: 08/924,316

[22] Filed: Sep. 5, 1997

[30] Foreign Application Priority Data

Sep. 30, 1996 [FR] France ................................ 96 11867

[51] Int. Cl.$^6$ ........................................................ H01S 3/10
[52] U.S. Cl. ........................................ 372/12; 372/98
[58] Field of Search .................................... 372/12, 92, 98

[56] References Cited

U.S. PATENT DOCUMENTS

| | | | |
|---|---|---|---|
| 5,381,431 | 1/1995 | Zayhowski | 372/25 |
| 5,495,494 | 2/1996 | Molva et al. | 372/98 |
| 5,832,010 | 11/1998 | Fulbert et al. | 372/22 |

FOREIGN PATENT DOCUMENTS

| | | |
|---|---|---|
| 0 653 824 | 5/1995 | European Pat. Off. . |
| 0 724 316 | 7/1996 | European Pat. Off. . |

OTHER PUBLICATIONS

J.J. Zayhowski, et al., IEEE Photonics Technology Letters, vol. 5, No. 10, pp. 1153–1155, Oct. 5, 1993, "Diode–Pumped Composite–Cavity Electrooptically Tuned Microchip Laser".

J.J. Zayhowski, et al., Optics Letters, vol. 14, No. 12, pp. 618–620, Jun. 15, 1989, "Frequency–Modulated Nd:YAG Microchip Lasers".

J.J. Zayhowski, et al., Optics Letters, vol. 17, No. 17, pp. 1201–1203, Sep. 1, 1992 "Diode–Pumped Microchip Lasers Electro–Optically Q Switched at High Pulse Repetition Rates".

Primary Examiner—James W. Davie
Attorney, Agent, or Firm—Oblon, Spivak, McClelland, Maier & Neustadt, P.C.

[57] ABSTRACT

The invention relates to a microlaser cavity switched with the aid of an electrooptical material (54). Electrodes (84, 86) are produced on support elements (80, 82) and the latter are then applied on either side of the electrooptical element. Solid electrodes can also be applied on either side of the electrooptical material.

21 Claims, 6 Drawing Sheets

ELECTROOPTICALLY SWITCHED SOLID MICROLASER WITH INDEPENDENT ELECTRODES AND PRODUCTION PROCESS

DESCRIPTION

1. Technical Field

The invention relates to the field of actively switched solid microlasers.

An advantage of the microlaser is its structure in the form of a stack of multilayers. The active laser medium is constituted by a material of limited thickness (between 150 and 1000 $\mu$m) and small size (a few mm$^2$), on which dielectric cavity mirrors are directly deposited. This active medium can be pumped by a III-V laser diode, which is either directly hybridized on the microlaser, or is coupled to the latter by an optical fibre.

Microlasers have numerous applications in fields as varied as the car industry, the environment, scientific instrumentation and telemetry.

2. Prior Art

Known microlasers generally have a continuous emission with a power of a few dozen mW. However, most of the aforementioned applications require peak power levels (instantaneous power) of a few kW supplied for $10^{-8}$ to $10^{-9}$ seconds with an average power of a few dozen mW.

In solid lasers, it is possible to obtain such high peak powers by making them operate in the pulsed mode at frequencies varying between 10 and $10^4$ Hz, for which purpose cavity switching processes are used.

A cavity can be actively or passively switched.

In the case of passive switching variable losses are introduced into the cavity in the form of a saturable absorbant material.

In the case of active switching, the value of the losses is externally controlled by the user, e.g. using a rotary cavity mirror, acoustooptical or electrooptical intracavity means changing either the path of the beam, or its polarization state. The storage time, the cavity opening time and the repetition rate can be chosen independently.

The article by Zayhowski et al. entitled "Diode-pumped microchip lasers electrooptically Q-switched at high pulse repetition rates", in Optics Letters, vol. 17, pp 1201–1203, 1992 describes an actively switched microlaser.

In this document, switching takes place in a configuration of two planar face coupled Fabry-Perot cavities. Such an assembly is illustrated in FIG. 1, where reference 2 designates the active medium of the microlaser and reference 4 an electrooptical material (LiTaO$_3$). The active medium 2 of the laser forms, with an input mirror 6 and an intermediate mirror 8, a first Fabry-Perot cavity. The switching material forms with the intermediate mirror 8 and output mirror 10, a second Fabry-Perot cavity. The electrooptical material 4 can e.g. be bonded to the surface of the intermediate mirror 8. The two cavities are coupled. Switching takes place by modifying the optical length of the electrooptical material 4 by an external action. On designating $L_1$, $n_1$, $\lambda_1$ (respectively $L_2$, $n_2$, $\lambda_2$) the lengths, optical indices and optical resonance wavelengths of the first cavity (respectively the second cavity), the relation $m_1\lambda_1=2n_1L_1$ and $m_2\lambda_2=2n_2L_2$ with $m_1$ and $m_2$ being integers.

Switching electrodes 12, 14 are placed perpendicular to the axis of the laser beam 16 on either side of the switching material 4. If a voltage V is applied between these electrodes, an electric field $E=V/e$, in which e is the distance between the electrodes (which corresponds to the thickness of the electrooptical material) results therefrom and the optical index $n_2$ of the electrooptical material thereof is modified. This affects the coupling of the two cavities and modifies the reflectivity of the intermediate mirror 8 seen by the laser medium. Thus, if the resonance wavelengths of the two cavities coincide ($\lambda_1=\lambda_2$ or $n_1L_1/n_2L_2=m_1/m_2$) the reflectivity of the second electrooptical cavity seen by the first cavity (laser material) will be at a minimum and there will be no laser action. Thus, by acting on the field E, it is possible to modify the resonance conditions of the microlaser and therefore the reflectivity of the second cavity and consequently active switching can take place.

The two states corresponding to a minimum reflectivity or a maximum reflectivity of the second cavity are illustrated in FIGS. 2A and 2B. In these drawings, the curve in the upper part gives the reflectivity of the second cavity as a function of the wavelength, the laser line being shown in the lower part. FIG. 2A corresponds to the case where the reflectivity of the second cavity is at its minimum value $R_{min}$ at the resonance wavelength of the first cavity $\lambda_1$. FIG. 2B corresponds to the case where the resonance wavelengths of the two cavities are no longer identical ($\lambda_1 \neq \lambda_2$) and where the second cavity has a maximum reflectivity $r_{max}$ at the wavelength $\lambda_1$.

For a YAG:Nd microlaser emitting at 1.06 $\mu$m, with an electrooptical switch constituted by LiTaO$_3$ with a thickness of 1 mm, the following typical values are obtained: $_1$=1.8, $n_2$=2, $L_1$=500 $\mu$m, $L_2$=900 $\mu$m. The maximum reflectivity variation of the second cavity is then obtained for approximately $d\lambda/\lambda=dL_2/L_2=dn_2/n_2=10^{-4}$.

The microlaser type described in the Zayhowski article referred to hereinbefore is produced by a manual process and involves bonding of precut fragments. This is incompatible with the mass production of microlasers.

Another type of actively switched microlaser is described in EP-724 316. A device described in this document is shown diagrammatically in FIG. 3, where reference 24 designates the active laser medium, such as e.g. YAG doped with neodymium (Nd). This medium is located between an input mirror 20 and a intermediate mirror 22 with which it constitutes a first resonant cavity. A second resonant cavity is constituted by the intermediate mirror 22, an output mirror 26 and a material 28, which is e.g. an electrooptical material such as LiTaO$_3$. A potential difference is applied to this material with the aid of two contact electrodes 30, 32. A pumping beam 34 is directed onto a concave input micromirror 20, produced on the input face of the laser material 24. This mirror makes it possible to obtain a diameter $\Phi$ of the laser beam 33 within the electrooptical medium 28, which is small, typically a few dozen micrometers. This makes it possible to bring the thickness of the electrooptical medium to a value between 100 and 500 $\mu$m. Such a structure can be produced by a collective production process compatible with mass production. Such a process, described in EP-724 316, involves a dozen stages making it possible to obtain a microlaser chip with:

two different materials, one being a laser material and the other an electrooptical material, three stacks of thin dielectric layers (one on each face and one between the two materials): an input mirror 20 on the laser material, an intermediate mirror 22 and an output mirror 26 on the electrooptical material, electrodes deposited on lateral faces of the electrooptical materials, the voltage applied making it possible to vary the index of the electrooptical material.

In summary, this process involves at least the following stages:

1) cutting the laser and electrooptical materials into slices,
2) polishing the two faces of the slices to obtain planar, parallel faces,
3) possible etching of spherical microsurfaces on the polished faces,
4) deposition of dielectric input, intermediate and output mirrors on the slices,
5) bonding a laser material lamina and an electrooptical material lamina,
6) protection of the output face on the electrooptical material, e.g. with the aid of a resin,
7) slotting the electrooptical material,
8) deposition of electrodes (e.g. Cr—Au) on the slotted face and in particular on the walls of the slots,
9) etching of the protective resin, which removes the gold coating on the top of the slots,
10) cutting microlaser chips following the bottom of the slots,
11) installation on a support with control voltage supply,
12) contacting with voltage supply tracks and deposited electrodes,
13) connection of the pumping diode to the microlaser.

It is thus possible to define a process compatible with mass production, but numerous technological stages are involved. The processes for the production of continuous or passively switched microlasers as described in EP-653 824 (U.S. Pat. No. 5,495,494) do not involve as many stages. Consequently, the production costs of an actively switched microlaser remain high compared with those of a continuous microlaser or a passively switched microlaser. The production process is longer and requires supplementary investment for machines and skilled labour. This also gives rise to reliability problems, because certain of the stages of the process are complicated (e.g. the stage of etching the protective resin on the mirror, or Cr—Au deposition on the resin without modifying the properties of the latter). In addition, two cutting stages are involved, namely the slotting stage and then the chip cutting stage.

Moreover, existing devices require the production of an electrical contact between the deposited electrodes and the control circuit modulating the voltage applied. Methods are available for bringing about this contact, but this makes the manufacture of the device more complicated. The contacts can e.g. be brought about by bonding using a silver lacquer or gum, bonding with a conductive adhesive containing silver, or by wire bonding (i.e. welding gold wires with a very small diameter between a few dozen and a few hundred micrometers). Finally the electrical performance characteristics are not always satisfactory. The resistance of the contact is not necessarily zero and this leads to a supplementary electric power consumption and heating, which is problematical with high control voltages.

DESCRIPTION OF THE INVENTION

The invention relates to a novel type of actively switched microlaser, whose structure can be obtained by a simpler collective production than that known from the prior art. Moreover, in such a device, the electrical contact between the control electrodes and the control circuit is obtained in a simpler manner than in the prior art.

More specifically, the invention relates to an actively switched microlaser cavity and its switching means comprising:

a medium constituted by an active laser material forming a first resonant cavity between an input mirror and an intermediate mirror, a switching element of an electrooptical material forming a second resonant cavity between the intermediate mirror and an output mirror and having a first and a second lateral surfaces, the switching element being placed between a first and a second support elements, a first switching electrode being produced on the first support element and being applied to the first lateral surface of the switching element, a second switching electrode being produced on the second support element and being applied to the second lateral surface of the switching element.

In such a device, the electrodes are produced on each of the support elements and are then contacted with the electrooptical material. Thus, the production process, which remains compatible with a collective production, is simpler than in the prior art process. On the one hand the two coupled cavities are produced and on the other the electrodes (e.g. deposited in thin film form) on the support elements and the support elements and electrodes are contacted with the switching element.

Moreover, the problem of producing contacts on the microlaser does not arise, because the electrodes applying the voltage to the electrooptical material are no longer placed on the microlaser, but are instead placed on the support.

According to an embodiment, the aim is to make the electrical field as homogeneous as possible in the crystal or the electrooptical material. Such a homogeneity condition is not necessarily implemented in the existing devices, the field lines generally being curved on the edges of the electrodes. As the electrodes are deposited on the electrooptical crystal, they are necessarily limited to the lateral surfaces of the latter. Thus, within the crystal, the field lines are curved. Such lines are shown in broken line form in FIG. 3 and are designated by the references 35, 37. FIG. 4 also illustrates a prior art structure, described in EP-724 316, having an active laser medium 36, an electrooptical material 38, its switching electrodes 40, 44 and electric contacts 42, 46 for said electrodes. The field lines are represented in continuous line form and their curvature is readily apparent. Thus, such a structure does not favour the homogeneity of the electric field in the electrooptical medium.

In order to solve this problem, the active laser medium has a thickness substantially equal to the thickness of the electrooptical element, each of the first and second lateral surfaces of the electrooptical element being extended respectively by a first and a second lateral surfaces of the active laser medium, the assembly constituted by the active laser medium and the electrooptical element being located between the first and second support elements, the first and second control electrodes respectively extending over at least all the first (respectively second) lateral surfaces of the electrooptical element and the active laser medium.

In this embodiment, the control electrodes, extending along the electrooptical element and beyond, ensure a good homogeneity of the electric field lines within the electrooptical material.

According to another embodiment, the active laser medium is placed between the first and second support elements and the switching electrodes can also be applied on either side of the active laser medium. Thus, the active laser medium is stressed between the two support elements. Such a stress induces in the laser material a non-homogeneous index variation if it is unidirectional. This induced birefringence makes it possible to favour a polarization of the laser beam.

In all the cases described hereinbefore, the first and second support elements can be opposite walls of a hole made in a substrate (e.g. a printed circuit board) and able to at least partly receive the electrooptical element, the first and second electrodes being produced on said walls. Preferably, the hole has a depth at least equal to the length of the electrooptical material.

The invention also relates to an actively switched microlaser and its switching means comprising:

a medium constituted by an active laser material forming a first resonant cavity between an input mirror and an intermediate mirror, a switching element of an electrooptical material forming a second resonant cavity between the intermediate mirror and an output mirror, said element having a first and a second lateral surfaces, the switching element being located between a first and a second solid electrodes, respectively applied to at least one part of the first and second lateral surfaces.

As solid electrodes are applied on either side of the electrooptical material, the production of the complete device is simplified compared with the prior art devices. On the one hand the two coupled cavities are produced and on the other the solid electrodes and the latter are brought into contact with the switching element. In addition, the contacts between the solid electrodes and a voltage control device can be easily implemented.

Each solid electrode can extend over at least the entire lateral surface of the electrooptical element against which it is applied.

The homogeneity of the electric field in the electrooptical material is improved if the active laser medium has a thickness which is substantially equal to the thickness of the electrooptical element, each of the first and second lateral surfaces of the electrooptical element being extended respectively by a first and a second lateral surfaces of the active laser medium, the first and second solid electrodes being respectively applied to the first (respectively second) lateral surfaces.

According to another aspect, the assembly constituted by the active laser medium and the electrooptical element is placed between the solid electrodes. This makes it possible to apply a stress to the active laser medium and consequently control the polarization of the light beam.

Finally, in order to adjust the contact between the electrooptical medium and the electrodes, a conductive joint can be placed at the interface between the electrooptical material and the electrodes.

The invention also relates to a process for producing an actively switched microlaser cavity and its switching means.

BRIEF DESCRIPTION OF THE DRAWINGS

The features and advantages of the invention will become more readily apparent from the following description of non-limitative embodiments with reference to the attached drawings, wherein show.

DETAILED DESCRIPTION OF EMBODIMENTS OF THE INVENTION

Figure 1:
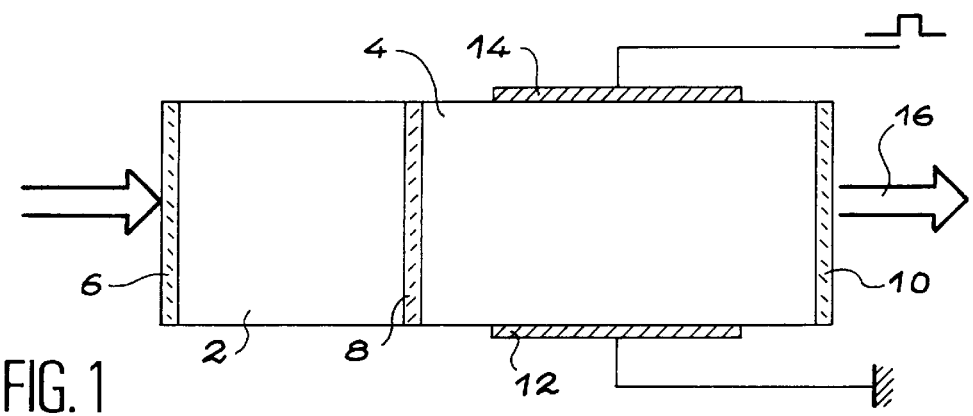
FIG. 1 A microlaser switched by an electrooptical material according to the prior art.
Figure 2A:
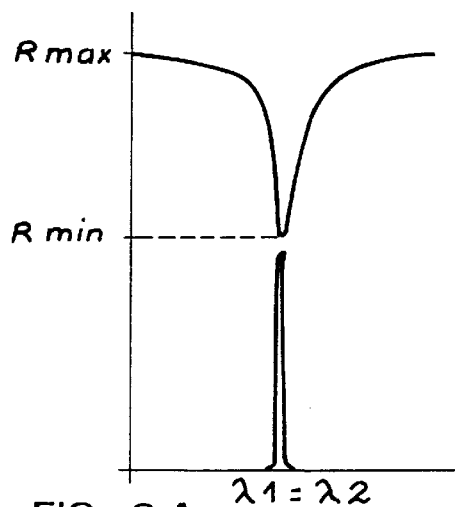
FIGS. 2A & 2B For an actively switched microlaser, the relative positions of the laser line and a mode of the cavity constituted by the switching material.
Figure 2B:
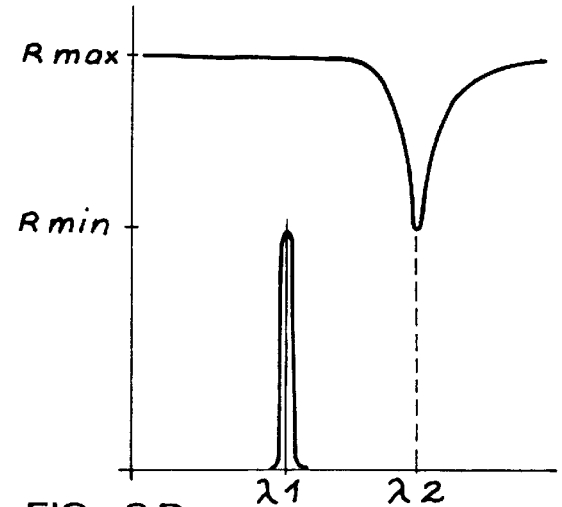
Figure 3:
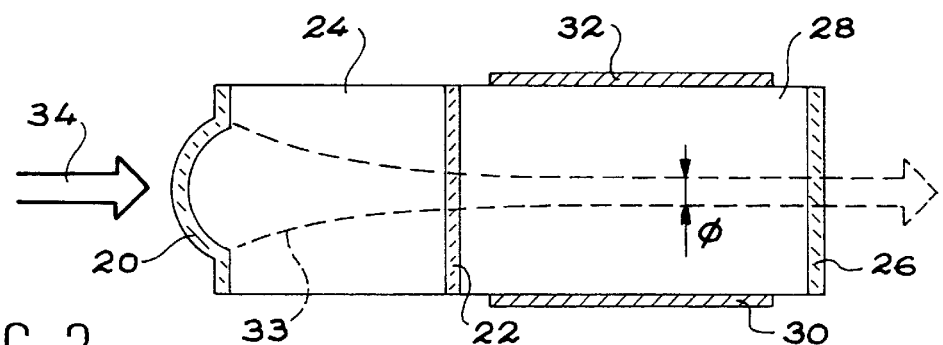
FIGS. 3 & 4 Other actively switched microlaser structures according to the prior art.
Figure 4:
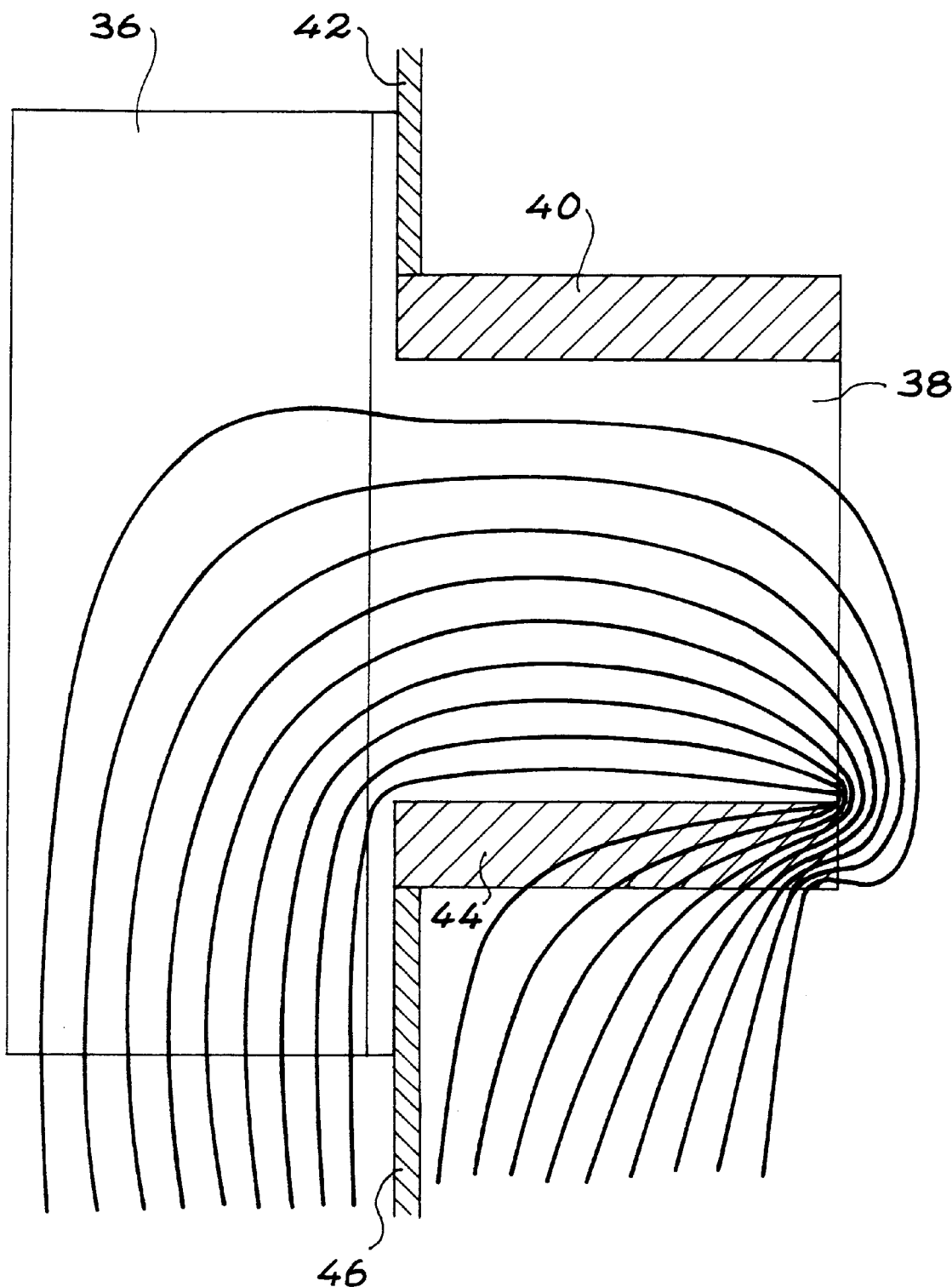
Figure 5A:
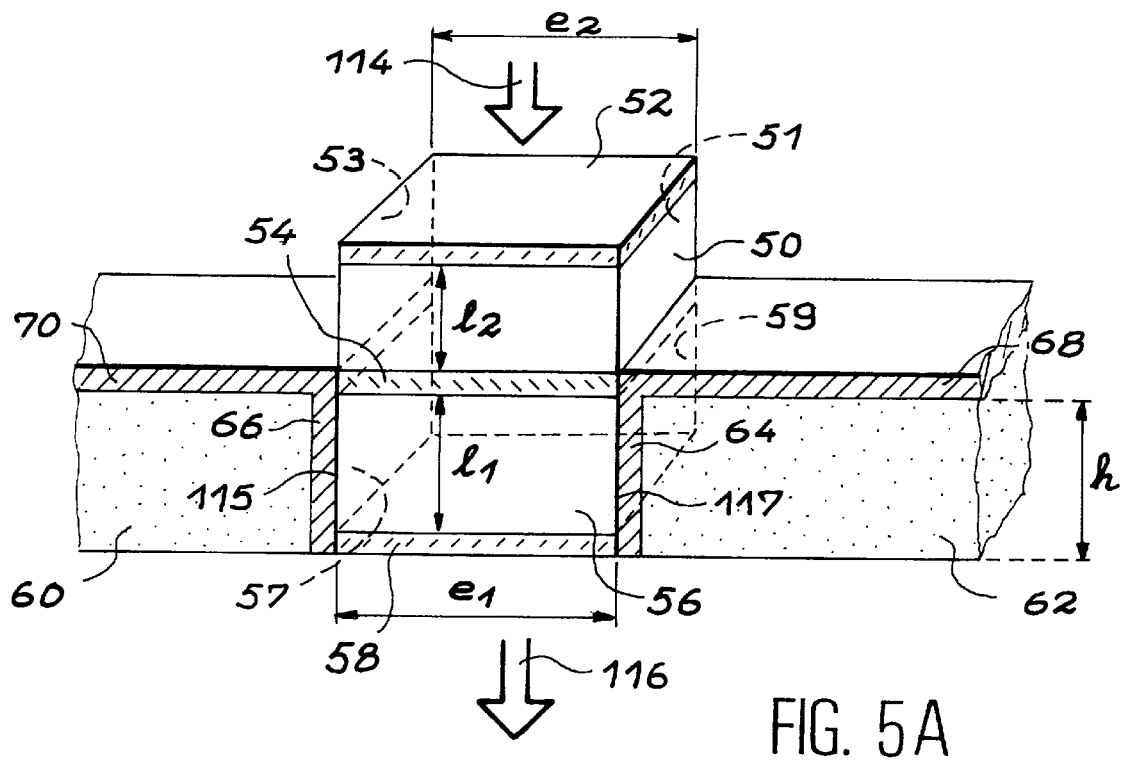
FIGS. 5A & 5B Embodiments of a device according to the invention.

FIG. 5A shows a first embodiment of the invention. It has an actively switched microlaser cavity, switching being ensured with the aid of an electrooptical material element. The microlaser has two coupled cavities operating on the same principles as those described relative to FIGS. 2A and 2B.

Thus, the microlaser has an active laser medium 50 forming with an input mirror 52 and an intermediate mirror 54 a first resonant cavity. The active medium can e.g. be a YAG medium doped with neodymium (Nd). It can also be a material chosen from one of the following: LMA ($LaMgAl_{11}O_{19}$), $YVO_4$, YSO ($Y_2SiO_5$), YLF ($YLiF_4$) or $GdVO_4$, etc. The neodymium doping for an emission of 1.06 $\mu$m was referred to hereinbefore. The doping can also be a doping with erbium or an erbiumytterbium codoping for an emission of about 1.5 $\mu$m. It can also be a Tm or Ho doping or a Tm—Ho codoping for an emission of approximately 2 $\mu$m.

The laser material can also be a phosphate glass (for an emission at 1.5 $\mu$m).

The length $l_2$ of the active laser medium is a few hundred micrometers.

A second resonant cavity is constituted by the intermediate mirror 54, an output mirror 58 and an electrooptical material element 56, such as of $LiTaO_3$. The length of said second material 56 is designated $l_1$.

The lengths $l_1$ and $l_2$ are measured along the axis of the cavity, i.e. along the emission axis of the laser beam. The laser beam emitted by the microlaser is represented by arrow 116 in FIG. 5A.

The electrooptical material 56 is located between two support elements 60, 62 on which are deposited, in thin film form, electrodes 64, 66 controlling the electric field within the electrooptical material. The support elements 60, 62, 80, 82 are preferably made from an electrically insulating, good heat conducting material. The electrodes are produced e.g. by metallization on support elements 60, 62 prior to the assembly of the latter with the microlaser. Therefore the electrodes are applied to the side walls 57, 59 of the electrooptical element.

The structure described hereinbefore is consequently perfectly compatible with a simplified, collective production process. In addition, as the electrodes are previously produced on the support elements 60, 62, they can easily be extended by metallizations or metal coatings, or by conductive tracks 68, 70 connecting them to a control circuit. It is thus possible to avoid the problems associated with producing contacts on electrodes previously deposited on the microlaser cavity.

In FIG. 5A, the substantially parallelepipedic support elements 60, 62 have a height h equal to or substantially equal to the length $l_1$ of the electrooptical material 56. These support elements 60, 62 can have a greater height h. In this case, not only the electrooptical material 56, but also part of the active laser medium 50, are located between the support elements 60, 62. In the same way, the electrodes 66, 64 extend not only on the lateral surfaces 57, 59 of the electrooptical material 56, but also on the lateral surfaces 51, 53 of the active laser medium 50. The greater the extension of the control electrodes of the electrooptical medim 56, the better the homogeneity of the electric field within said medium.

Figure 5B:
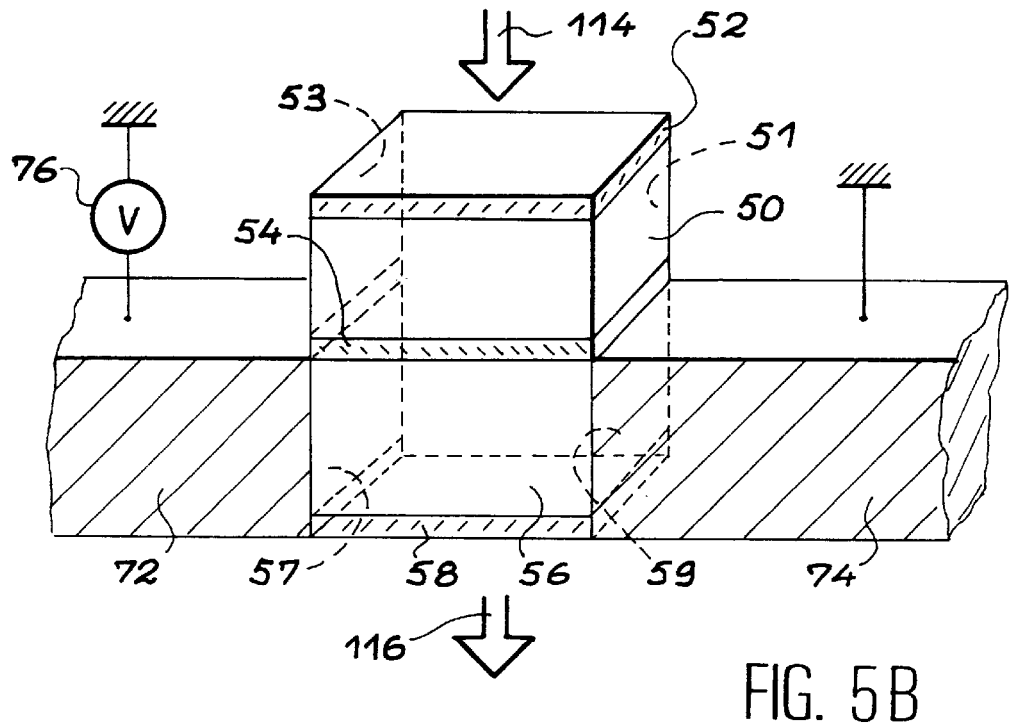

Another embodiment is shown in FIG. 5B, where references identical to those of FIG. 5A designate identical or corresponding elements. In particular, the microlaser still has the same structure with two coupled cavities. The electrooptical medium 56 is placed between two solid electrodes 72, 74 applied to its side walls 57, 59. The solid electrodes are substantially parallelepipedic and have a height h equal or substantially equal to $l_1$ or which can exceed $l_1$. One of these electrodes 72 can be connected to means 76 for raising it to a certain potential V, whilst the other electrode 74 is e.g. maintained at earth potential. The connection of the electrodes 72, 74 to the control means 76 of the voltage can be implemented particularly easily. Here again, the production of the complete device is particularly easy, because the assembly of the two laser cavities and electrooptical element takes place beforehand and subsequently the solid electrodes 72, 74 are applied to the side walls of the electrooptical element. As in the case of FIG. 5A, said electrodes can extend beyond the electrooptical element (e.g. h>$l_1$) and at least partly cover the side walls 51, 53 of the active laser medium 50, which improves the homogeneity of the field in the electrooptical material.

Figure 6A:
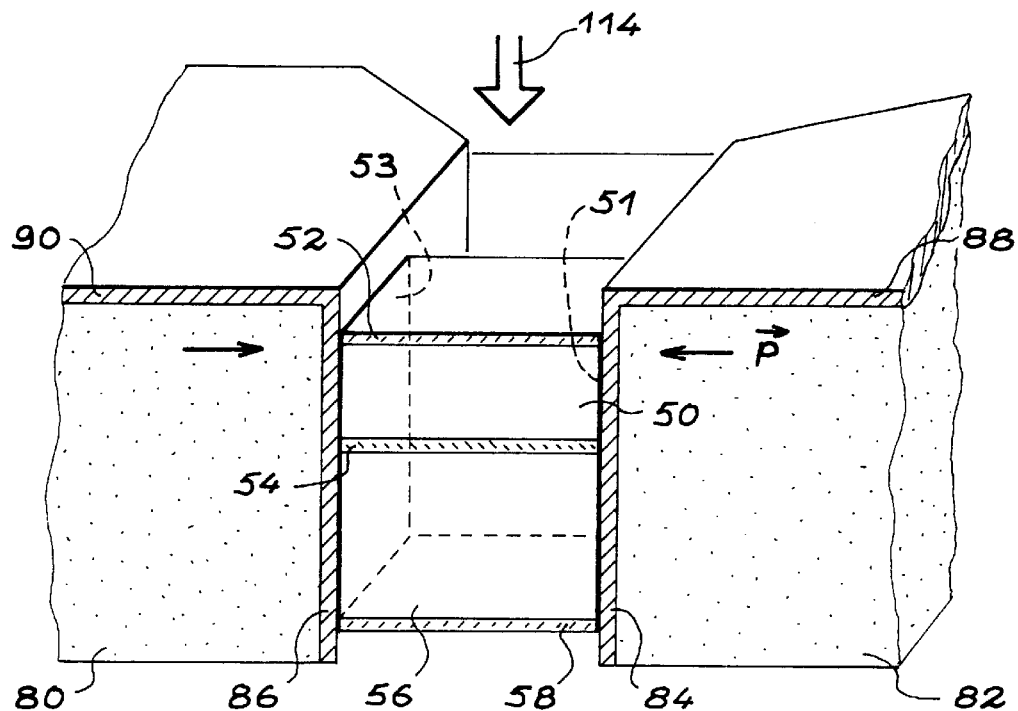
FIGS. 6A & 6B Other embodiments of a device according to the invention.
Figure 6B:
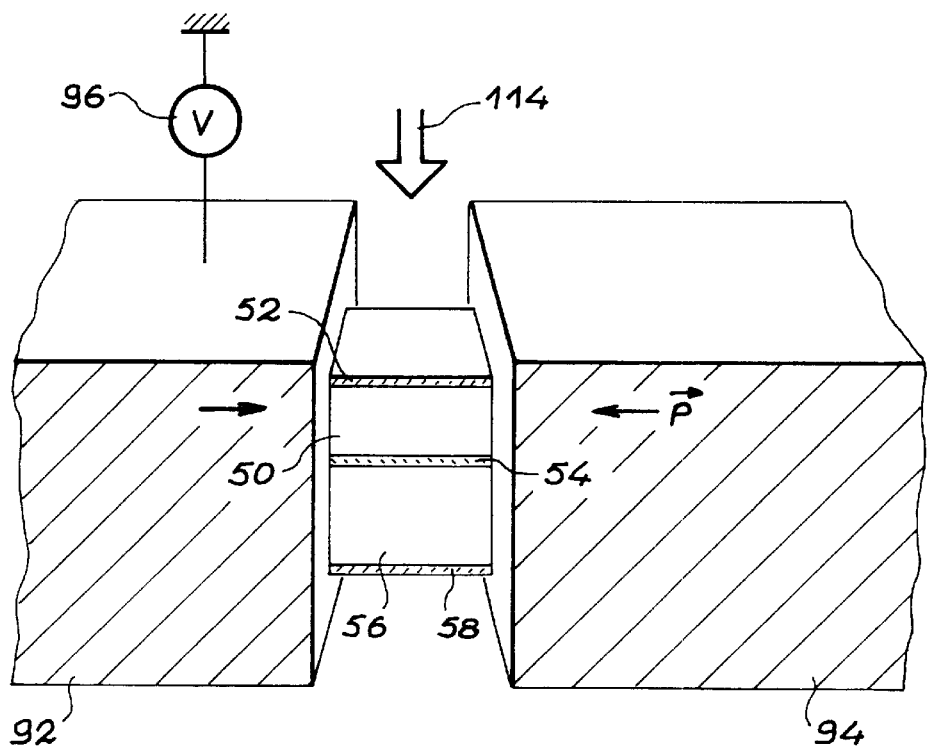

FIG. 6 shows an embodiment in which the support elements 80, 82 have a large lateral section than the surfaces of the side walls of the active laser medium and the electrooptical material 56 considered together. References 84, 86 designate the contact electrodes extending over the entire lateral surfaces 51, 53, 57, 59 of the microlaser. These control electrodes are connected to control metal coatings or tracks 88, 90, which can make it possible to connect them to a voltage control circuit giving the same advantages as those described in conjunction with FIG. 5A. In FIG. 6B, solid electrodes 92, 94 laterally surround the complete microlaser.

These structures of FIGS. 6A and 6B are also compatible with a simplified microlaser collective production process. Moreover, the problem of the contact of the electrodes with the voltage supply means is once again solved, because this contact is very easily ensured on the electrodes 92, 94, or on the connection tracks 88, 90 on the supports 80, 82.

Figure 8:
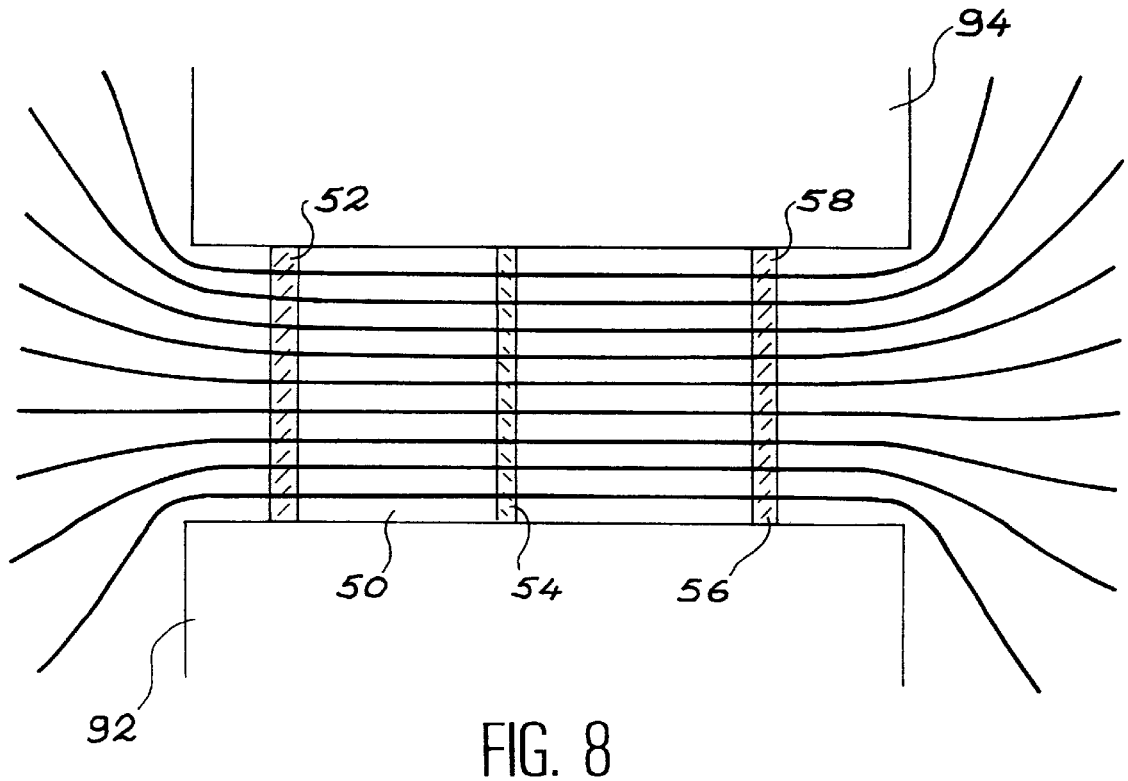
FIG. 8 Diagrammatically field lines in the case of electrodes extending along the microlaser.

The extension of the electrodes along the complete microlaser makes it possible to improve the homogeneity of the electric field within the electrooptical element 56. FIG. 8 shows in the case of solid electrodes 92, 94 applied on either side of a microlaser having two coupled cavities, the field lines. In the part corresponding to the electrooptical medium 56, the field lines are straight and regularly spaced, so that the field is homogeneous as regards amplitude and direction, which ensures a better operation of the electrooptical switching material.

A better homogeneity of the field in the electrooptical material permits a better exploitation of the electrooptical effect. Therefore the electric power consumption is reduced, because lower electric fields can be adequate for the operation of the electrooptical material.

In addition, the arrangements of FIGS. 6A and 6B, in which the electrodes or support elements 80, 82 also extend on either side of the active medium 50 offer the following advantage. A certain pressure p can be applied on either side of the active laser medium 50. It is consequently possible to control the polarization of the emitted beam. Thus, the stress induces in the laser material an index variation, which is not homogeneous if it is unidirectional.

The effect involved will be explained in conjunction with FIGS. 7A and 7B.

Figure 7A:
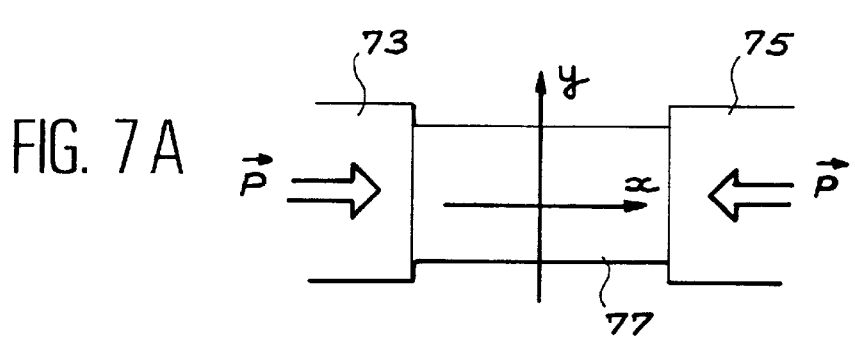
FIGS. 7A & 7B Respectively a material to which stresses are applied and a gain curve.
Figure 7B:
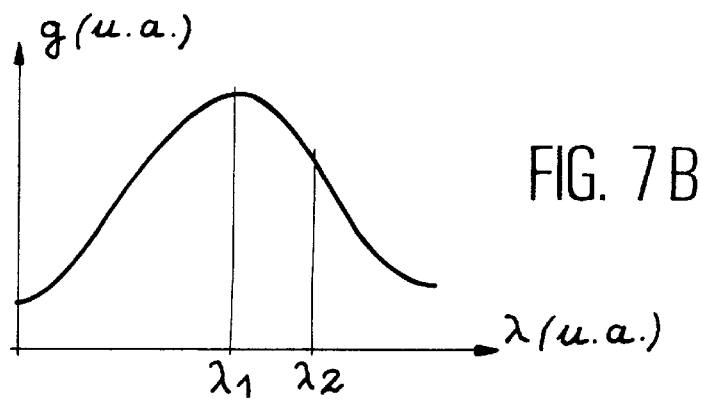

In FIG. 7A, two elements 73, 75 apply a stress or force P (respectively −P) to an optical material 77. These stresses produce variations in the index of this material by a photoelastic effect. The tensor of the photoelastic coefficient links the variations of coefficients of the ellipsoid of the indices with the stresses applied. By applying a pressure P along x, different stresses are produced along x and y. Thus, the optical index varies differently along x and y and a x-polarized beam will not have the same index as a y-polarized beam. This leads to two separate polarization modes not having the same wavelength. The first mode has a length $\lambda_1$ (FIG. 7B) and a second mode has a wavelength $\lambda_2$. Mode $\lambda_1$ has more gain and is therefore favoured compared with mode $\lambda_2$. Thus, one of the polarization directions is favoured compared with the other.

It is pointed out that in certain materials having a birefringence ($|n_y - n_x|$, where $n_x$ and $n_y$ respectively represent the optical index along x and y), which is natural. This is the case with the aforementioned materials YLF and LMA, which are said to be non-isotropic. Materials such as YAG and glass, also referred to hereinbefore, are isotropic.

This induced birefringence makes it possible to favour a polarization of the laser beam. In the absence of a control, polarization is established in a random manner. For the case of a birefringent electrooptical material (e.g. $LiTaO_3$), the electrooptical coefficients can depend on the polarization of the laser beam. In this case the control voltages will vary as a function of the polarization state, which is random in time and even within the microlaser. If the microlaser is stressed on installation, the polarization is fixed in a stable manner.

A stress can be applied to the active laser medium even if the electrodes or support elements do not entirely cover the lateral surfaces 51, 53 of the laser medium 50. Moreover, the active laser medium is shown in all the drawings with a width $e_2$ equal to or substantially equal to the width $e_1$ of the switching element. However, it is also possible to apply a stress to the active laser medium in the case where $e_1 \neq e_2$, e.g. $e_2 < e_1$. In this case it is sufficient to have support elements or solid electrodes with a shape adapted to that of the microlaser. The structures of FIGS. 6A and 6B have the advantage of a good homogeneity of the electric field in the electrooptical material, as well as the advantage of being able to apply a stress to the entire surface of the side walls of the active laser medium.

Figure 9:
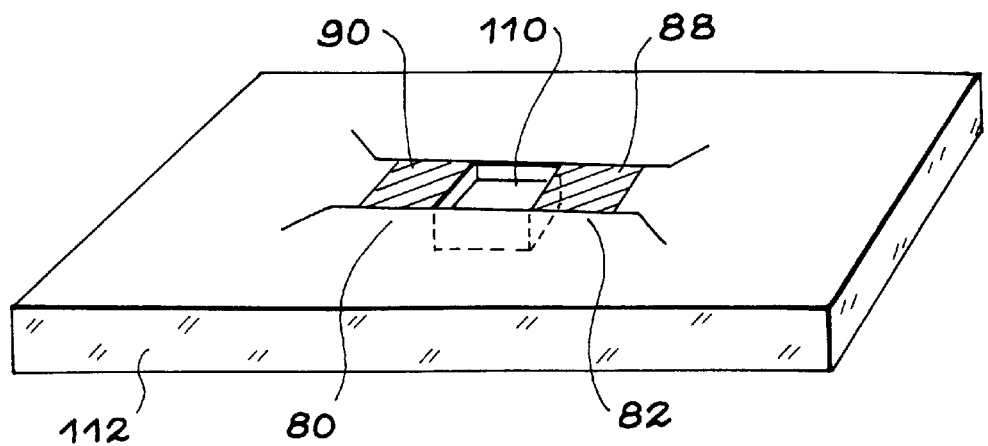
FIG. 9 An application of a device according to the invention.

As illustrated in FIG. 9, the support elements can be the opposite walls of a hole 110 made in a substrate 112. The dimensions of this hole are adapted to the transverse dimensions of the microlaser (i.e. to the dimensions measured in a plane perpendicular to the axis of the pumping beam and the laser beam emitted by the microlaser). It is then sufficient to introduce the assembly of the two coupled cavities of the microlaser into the hole for said assembly to be maintained there. Moreover, opposite walls of the hole are covered by metal coatings fulfilling the function of contact electrodes on either side of the electrooptical material. These metal coatings can be extended by surface metal coatings 88, 90 of the substrate 112.

Figure 10:
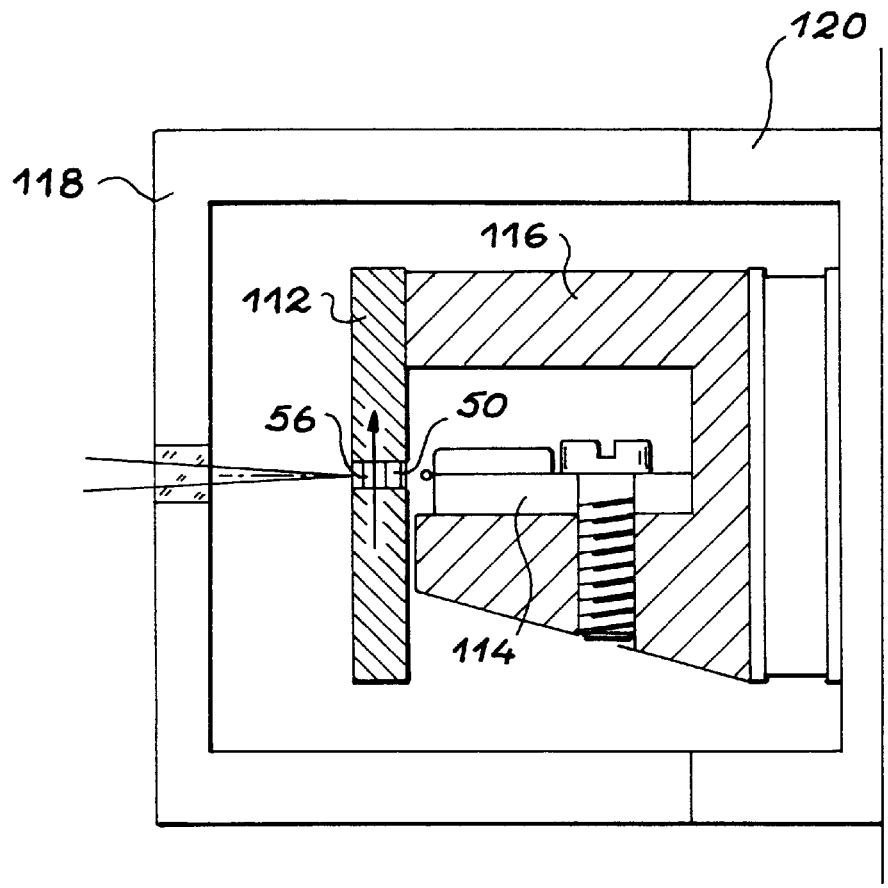
FIG. 10 A microlaser integrated on a ceramic plate and coupled to pumping means.

According to an example illustrated in FIG. 10, the substrate is a ceramic wafer 112 (e.g. AlN). A printed circuit can be produced on this wafer and integrated components can be integrated onto said printed circuit. Thus, the microlaser 50, 56 is installed on a printed circuit wafer like an electronic component. Everything is then placed in a box 118 with part of the control electronics (e.g. the high voltage converter). This microlaser box can incorporate the laser pumping diode 114 fitted to a support 116 and placed on the base 120 of the box, a thermoelectric cooling element 122 of the Peltier effect type. It is then merely necessary to connect the assembly to a low voltage supply.

No matter what the embodiment envisaged, it is preferable to have a good contact between the electrooptical material and the electrodes, no matter whether the latter are in the form of a metal coating on the substrate or in the form of solid electrodes. Thus, the greater the distance between the electrooptical material and the electrodes, the weaker the field in the electrooptical material. For a better adjustment, the space between the electrodes and the electrooptical material is filled with a conductive material, e.g. of a flexible or melted type (e.g. indium melted at 150° C.). Thus, such a material serves as a conductive joint between on the one hand the electrodes and on the other the electrooptical material. The trace of such a joint is shown by references 115, 117 in FIG. 5A. In practice, such a joint is only necessary in a single direction, along the faces where the field is to be applied.

The devices described hereinbefore can be coupled to a pumping diode, either directly or by an optical fibre. A pumping beam is indicated by the arrow 114 in FIGS. 5A and 6B and the emitted laser beam is represented by the arrow 116.

A process for the production of a device according to the invention will now be described. The production of microlasers according to the invention can take place in accordance with the following stages, all compatible with collective production. These stages define a process which, overall, is simpler than the prior art collective processes and takes less time.

1) In a first stage, laser and electrooptical material plates are cut into slices.

2) This is followed by the polishing of the two faces of the slices, so as to obtain parallel, planar faces.

3) Optionally, spherical microsurfaces can be etched on the polished surfaces, such a concave micromirror production stage being described in EP-724 316, using photolithography and machining procedures.

4) This is followed by the deposition of input mirrors, intermediate mirrors and output mirrors on the material slices.

5) This is followed by the bonding of a laser material lamina and an electrooptical material lamina.

The above stages 1 to 5 are described in greater detail in EP-724 316.

The following stages differ from the stages described in the latter document.

6) This is followed by the cutting of microlaser chips to a size of approximately 1 mm². This cutting takes place when the microlaser is still not in contact with the switching electrodes.

7) Moreover, support elements which have a shape adapted to the microlaser are metallized. Alternatively, solid electrodes are produced, also having a size and shape compatible with the microlaser. In the case of support elements to be metallized, as stated hereinbefore, these elements can be the opposite walls of a hole made in a substrate, e.g. an integrated circuit board.

8) The microlaser is mounted between the electrodes produced on support elements, or between solid electrodes. In the case where the electrodes are produced on the walls of a hole made in a substrate, the microlaser is simply introduced into said hole.

9) The pumping diode is then connected to the microlaser.

Thus, the complete process for producing the structure according to the invention is simpler than the prior art processes. In particular, there are no longer problems associated with the connection to a control circuit of electrodes already deposited on either side of the electrooptical medium. In addition, the stages of depositing resin and eliminating said resin after producing the electrodes on either side of the electrooptical material are rendered superfluous. Finally, the slotting stage is eliminated.

This process makes it possible to produce a microlaser at a cost comparable to that of passively switched or continuous microlasers. In addition, the reliability and robustness of the microlasers and their monolithic character are retained. The production process is virtually identical to that of the passively switched microlaser described in EP-653 824. The process according to the present invention e.g. involves one less liquid phase epitaxy stage and one more bonding stage. This makes it possible to envisage the compatibility of certain machines for producing stages common to the passively switched and actively switched microlaser production processes.

We claim:

1. Actively switched microlaser cavity and its switching means comprising:

a medium constituted by an active laser material forming a first resonant cavity between an input mirror and an intermediate mirror, a switching element of an electrooptical material forming a second resonant cavity between the intermediate mirror and an output mirror and having a first and a second lateral surfaces, the switching element being placed between a first and a second support elements, a first switching electrode being produced on the first support element and being applied to the first lateral surface of the switching element, a second switching electrode being produced on the second support element and being applied to the second lateral surface of the switching element.

2. Actively switched microlaser cavity and its switching means according to claim 1, each switching electrode extending over at least the entire lateral surface of the switching element to which it is applied.

3. Actively switched microlaser cavity and its switching means according to one of the claims 1 or 2, the active laser medium also being located between the first and second support elements.

4. Actively switched microlaser cavity and its switching means according to claim 3, the switching electrodes of the switching element being applied on either side of the active laser medium.

5. Actively switched microlaser cavity and its switching means according to one of the claims 1 or 2, the switching element having a thickness $e_1$, the active laser medium having a thickness $e_2$ substantially equal to the switching element thickness $e_1$, each of the first and second lateral surfaces of the switching element being extended respectively by a first and a second lateral surfaces of the active laser medium, the assembly constituted by the active laser medium and the switching element being placed between the first and second support elements, the first and second switching electrodes respectively extending over at least all the first (respectively second) lateral surfaces of the switching element and the active laser medium.

6. Actively switched microlaser cavity and its switching means according to one of the claims 1 or 2, the first and second support elements being the opposite walls of a hole made in a substrate and able to at least partly receive the switching element, the first and second electrodes being produced on said walls.

7. Actively switched microlaser cavity and its switching means according to claim 6, the hole having a depth at least equal to the length ($l_1$) of the electrooptical material.

8. Actively switched microlaser cavity and its switching means according to claim 6, the substrate being a printed circuit board.

9. Actively switched microlaser and its switching means comprising:
   a medium constituted by an active laser material forming a first resonant cavity between an input mirror and an intermediate mirror,
   a switching element of an electrooptical material forming a second resonant cavity between the intermediate mirror and an output mirror, said element having a first and a second lateral surfaces,
   the switching element being located between a first and a second solid electrodes, respectively applied to at least one part of the first and second lateral surfaces.

10. Actively switched microlaser cavity and its switching means according to claim 9, each solid electrode extending over at least the entire lateral surface of the electrooptical element to which it is applied.

11. Actively switched microlaser cavity and its switching means according to claim 10, the assembly constituted by the active laser medium and the electrooptical element being placed between the solid electrodes.

12. Actively switched microlaser cavity and its switching means according to claim 9, the switching element having a thickness $e_1$, the active laser medium having a thickness $e_2$ substantially equal to the switching element thickness $e_1$, each of the first and second lateral surfaces of the switching element being respectively extended by a first and a second lateral surfaces of the active laser medium, the first and second solid electrodes being respectively applied to all the first (respectively second) lateral surfaces of the active laser medium and the switching element.

13. Actively switched microlaser cavity and its switching means according to one of the claims 1 or 9, a conductive joint being located at the interface between the switching element and the switching electrodes.

14. Process for producing an actively switched microlaser cavity and its switching means involving the following stages:
   producing a microlaser cavity having:
      an active laser mirror forming a first resonant cavity between an input mirror and an intermediate mirror,
      a switching element of an electrooptical material forming a second resonant cavity between the intermediate mirror and an output mirror, producing a first and a second switching electrodes of a first and a second support elements,
   contacting the first and second switching electrodes with first and second lateral surfaces of the switching element.

15. Process according to claim 14, the first and second support elements also being brought into contact with at least part of the first and second lateral surfaces of the active laser medium.

16. Process according to claim 14, the first and second switching electrodes also being contacted with at least part of the first and second lateral surfaces of the active laser medium.

17. Process according to claims 15 or 16, the support elements exerting a stress on the active laser medium.

18. Process according to claim 14, the first and second support elements being opposite edges of a hole made in a substrate, the stage of contacting the electrodes with the lateral surfaces of the switching element being a stage of introducing the switching element into the hole made in the substrate.

19. Process for the production of an actively switched microlaser cavity and its switching means, involving the following stages:
   producing a microlaser cavity with:
      an active laser mirror forming a first resonant cavity between an input mirror and an intermediate mirror,
      a switching element of an electrooptical material forming a second resonant cavity between the intermediate mirror and an output mirror, producing a first and a second solid switching electrodes, contacting the first and second switching electrodes with first and second lateral surfaces of the switching element.

20. Process according to claim 19, the first and second switching electrodes also being brought into contact with at least part of the first and second lateral surfaces of the active laser medium.

21. Process according to claim 20, the first and second electrodes exerting a stress on the active laser medium.

* * * * *